United States Patent
Suzuki et al.

[11] Patent Number: 5,934,799
[45] Date of Patent: Aug. 10, 1999

[54] VEHICULAR LAMP BODY COUPLED TO LENS WITH DIELECTRIC BONDING AGENT, AND METHOD THEREOF

[75] Inventors: Michihiko Suzuki; Kazuhiro Yamazaki, both of Shizuoka, Japan

[73] Assignee: Koito Manufacturing Co., Ltd., Tokyo, Japan

[21] Appl. No.: 08/889,593

[22] Filed: Jul. 8, 1997

[30] Foreign Application Priority Data

Jul. 8, 1996 [JP] Japan .................................. 8-197014

[51] Int. Cl.⁶ .................................................. F21M 3/00
[52] U.S. Cl. ............................ 362/507; 362/267; 362/310
[58] Field of Search .................................. 362/487, 507, 362/267, 310, 311

[56] References Cited

U.S. PATENT DOCUMENTS

| | | | |
|---|---|---|---|
| 4,390,931 | 6/1983 | Gorick et al. | 362/267 |
| 4,447,862 | 5/1984 | Shanks | 362/267 |
| 4,604,679 | 8/1986 | Rolando et al. | 362/267 |
| 4,612,607 | 9/1986 | Segoshi et al. | 362/267 |
| 4,675,793 | 6/1987 | Capellari et al. | 362/267 |
| 4,802,068 | 1/1989 | Mokry | 362/267 |
| 4,860,173 | 8/1989 | Jocher et al. | 362/267 |
| 4,907,134 | 3/1990 | Mori | 362/61 |
| 5,113,331 | 5/1992 | Nagengast | 362/267 |
| 5,188,444 | 2/1993 | Makita et al. | 362/267 |
| 5,285,357 | 2/1994 | Makita | 362/267 |
| 5,516,390 | 5/1996 | Tomita et al. | 362/267 |
| 5,556,584 | 9/1996 | Yamazaki et al. | 264/46.5 |
| 5,560,706 | 10/1996 | Yamazaki et al. | 362/267 |
| 5,685,628 | 11/1997 | Feger et al. | 362/267 |

*Primary Examiner*—Laura Tso
*Attorney, Agent, or Firm*—Sughrue, Mion, Zinn, Macpeak & Seas, PLLC

[57] ABSTRACT

In a lamp body and lens bonding structure and a lamp body and lens bonding method to form a vehicular lamp, a dielectric bonding agent (6) is applied to the joint part of a lamp body (1) made of polypropylene resin. The joint part of a lens (2) is engaged with the joint part of the lamp body (1) through the layer of dielectric bonding agent (6). Thereafter, the dielectric bonding agent (6) is solidified by high frequency dielectric heating treatment to fixedly bond the joint part of the lamp body and the joint part of the lens to each other.

9 Claims, 6 Drawing Sheets

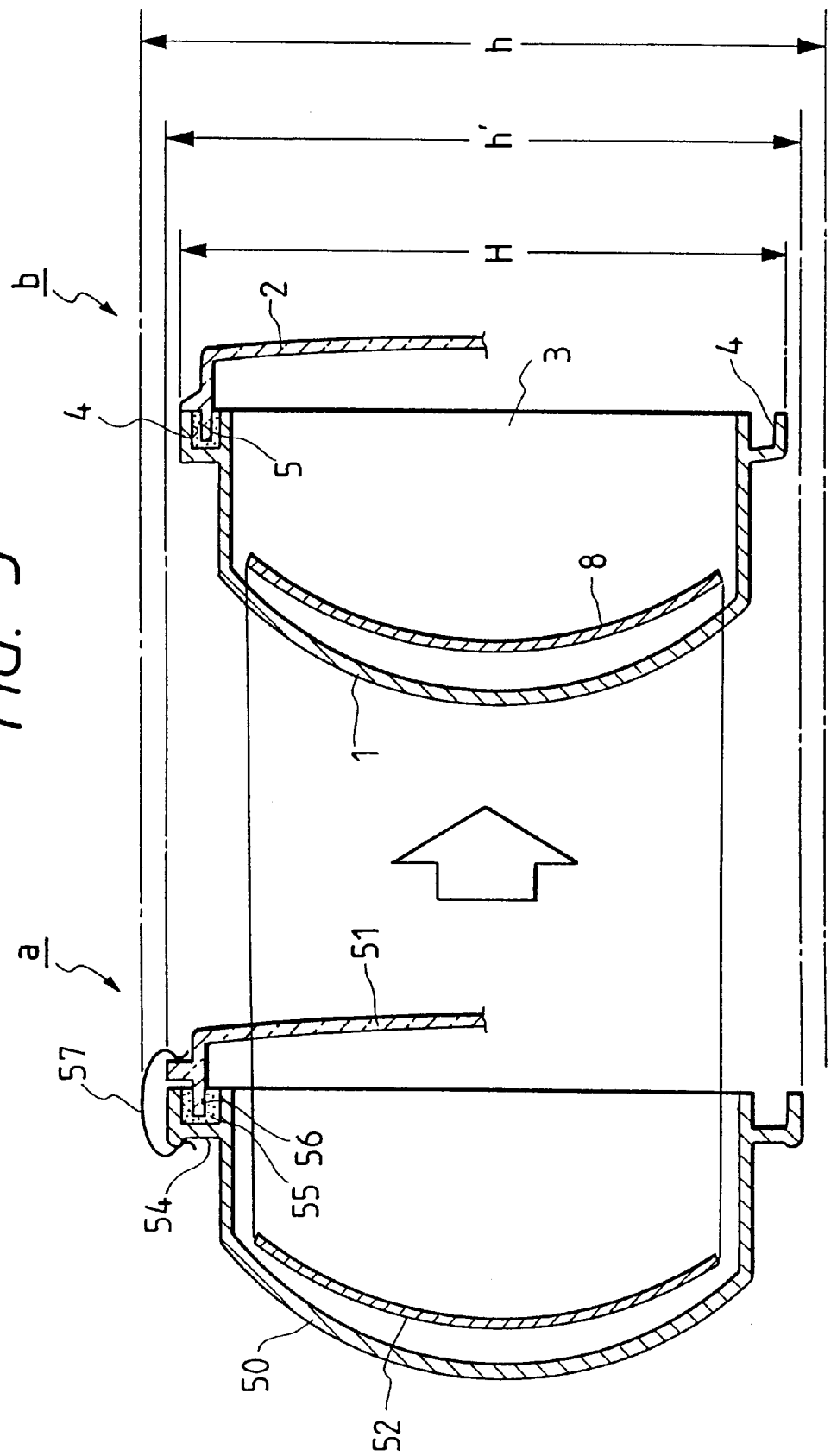

VEHICULAR LAMP BODY COUPLED TO LENS WITH DIELECTRIC BONDING AGENT, AND METHOD THEREOF

BACKGROUND OF THE INVENTION

1. Field of the Invention

The present invention relates to a technique of bonding a lamp body and a lamp lens to each other to form a vehicular lamp, and more particularly to a bonding structure and a bonding method in which an adhesive agent is solidified by a so-called "dielectric heating method" in which a high frequency voltage is applied to a dielectric bonding agent applied to the seal groove of a lamp body, thereby to fixedly bond the leg of the lens to the seal groove of the lamp body.

2. Related Art

FIGS. 10 and 11 show a conventional structure of a vehicular lamp. According to the conventional structure, a front opening of a lamp body 50 formed from polypropylene resin (hereinafter referred to as "PP resin", when applicable) or the like is covered with a front lens 51 (hereinafter referred to merely as "a lens 51", when applicable) made of glass, PC resin, PMMA resin, or the like, and a small lamp bulb 53 is fitted at the focal position F of a reflector 52 formed on an inner surface of the lamp body 50. The lens 51 is fixedly bonded to the lamp body 50 as follows: First, the seal groove 54 of the lamp body 50 (hereinafter also referred to as a joint part of the lamp body) is filled with a hot melt sealing agent 55, and then the leg 56 of the lens 51 (hereinafter also referred to as a joint part of the lens) is fitted in the seal groove 54 of the lamp body 50. In addition, mechanical tightening means 57 such as a plate spring, a lance, and screws is employed to combine the lens with the lamp body.

In the conventional above-described bonding method, the molten hot melt sealing agent 55 is applied to the seal groove 54 and the leg 56 which are the joint parts of the lens and the lamp body, and thereafter the agent 55 thus applied is cooled. The bonding of the leg 56 to the seal groove 54 is accomplished within several minutes. Hence, the method is advantageous in that it is high in productivity, so that the vehicular lamp requires low manufacturing cost. However, the method suffers from a difficulty that, since the hot melt sealing agent 55 is thermoplastic material, the resultant vehicular lamp is low in heat resistance. Hence, in order to increase the force of adhesion between the joint parts 54 and 56, it is necessary to utilize the above-described mechanical tightening means 57. Furthermore, in order to improve the water resistance of the joint parts 54 and 56, it is necessary to increase the widths (x and y) of the seal groove 54, thereby to increase the quantity of hot melt sealing agent 55 applied to the seal groove 54. However, this may make the external appearance of the joint parts 54 and 56 vehicular lamp unattractive.

On the other hand, the thermoplastic adhesive agent is not well bonded to the PP resin. In order to solidify it, a heat solidifying method using hot air or infrared rays, or a wet solidifying method is employed. Therefore, the method is low in productivity. Furthermore, with the method, resin members such as the lamp body and the lens may be deformed. Hence, the method is not applicable to the manufacture of vehicular lamps.

SUMMARY OF THE INVENTION

In view of the foregoing difficulties accompanying the conventional vehicular lamp or the conventional method of forming the vehicular lamp, an object of the invention is to provide a vehicular lamp which can be formed at a low manufacturing cost, capable of increasing the adhesive strength without requiring any mechanical reinforcing member such as a plate spring, and a method of forming the vehicular lamp.

The present invention provides a lamp body and lens bonding structure, and a lamp body and lens bonding method to form a vehicular lamp, in which atmospheric plasma treatment is applied continuously, in an in-line system, to a lamp body of PP resin low in adhesive property, and the adhesive agent is solidified in an extremely short time so as to obtain the productivity which is substantially equal to that which is obtained with a hot melt sealing agent employed, and to positively bond the lamp body and the lens to each other.

In a method of forming the vehicular lamp having a lamp body and lens, according to the invention, a dielectric bonding agent is applied to the joint part of a lamp body made of polypropylene resin, the joint part of a lens is engaged with the joint part of the lamp body through the dielectric bonding agent, and thereafter the dielectric bonding agent is solidified to fixedly bond the joint part of the lamp body and the joint part of the lens to each other.

Furthermore in the bonding structure, a dielectric bonding agent is applied to a seal groove as the joint part of a lamp body, a leg as the joint part of a lens engages with the joint part of the lamp body through the dielectric bonding agent, and thereafter the dielectric bonding agent is solidified to fixedly bond the joint part of the lamp body and the joint part of the lens to each other; alternatively, the leg is the joint part of the lamp body, while the seal groove is the joint part of the lens. Moreover, in the bonding structure, the width (X) of the seal groove is smaller than 2.5 times the wall thickness (Z) of the leg (X<2.5 Z), so that the width (H) of the vehicular lamp may be smaller than that (h) of the conventional vehicular lamp.

In a lamp body and lens bonding method to form a vehicular lamp, according to the invention, after the inner surface of a seal groove of a lamp body which is one joint part or of a lens is subjected to atmospheric plasma treatment to activate the inner surface of the seal groove, a dielectric bonding agent is applied thereto, a leg of the lens which is the other joint part or of the lamp body is engaged through the dielectric bonding agent with the seal groove, and thereafter a high frequency voltage is applied across the outer surfaces of the seal groove and the leg.

Hence, in the method, the dielectric bonding agent is solidified instantaneously, and the joint parts are positively bonded to each other. Hence, the vehicular lamp according to the invention is high in productivity, and the space occupied by the vehicular lamp manufacturing equipment is relatively small. This means that the vehicular lamp is greatly reduced in manufacturing cost.

BRIEF DESCRIPTION OF THE DRAWINGS

FIG. 3 shows dimensional comparison of a conventional vehicular lamp with the vehicular lamp of the invention.

FIG. 4A is a longitudinal sectional view showing essential parts of another example of the vehicular lamp in which the lens has a seal groove while a lamp body has a leg; FIG. 4B is a longitudinal sectional view showing essential parts of another example of the vehicular lamp in which its lamp body and lens have substantially L-shaped legs, respectively; and FIG. 4C. is also a longitudinal sectional view showing essential parts of another example of the vehicular lamp in which its lamp body and lens have flange-shaped joint parts which are protruded circumferentially;

FIG. 5A is a rear view of the lamp body, and FIG. 5B is an enlarged sectional view showing essential parts of a seal groove;

FIG. 6A is a side view of the lamp body, and FIG. 6B is an enlarged sectional view showing essential parts of the seal groove;

FIG. 7A is a rear view of the lamp body, and FIG. 7B is an enlarged sectional view showing essential parts of the seal groove;

FIG. 8A is a side view, and FIG. 8B is an enlarged sectional view showing essential parts of the seal groove;

FIG. 9A is a side view showing the lamp body and a lens which are held between the upper and lower jigs, and FIG. 9B is an enlarged sectional view showing essential parts of the seal groove;

DESCRIPTION OF THE PREFERRED EMBODIMENTS

A lamp body and lens bonding structure to form a vehicular lamp, which constitutes a first embodiment of the invention, will be described with reference to the accompanying drawings.

Figure 1:
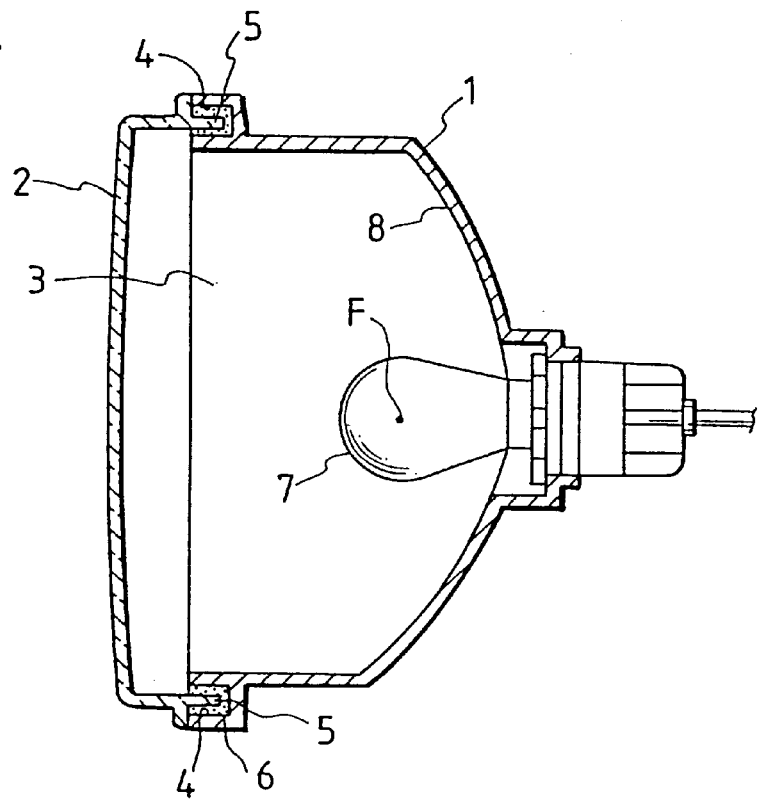
FIG. 1 is a longitudinal sectional view of a vehicular lamp for a description of an example of a lamp body and lens bonding structure, which constitutes a first embodiment of the invention.
Figure 2:
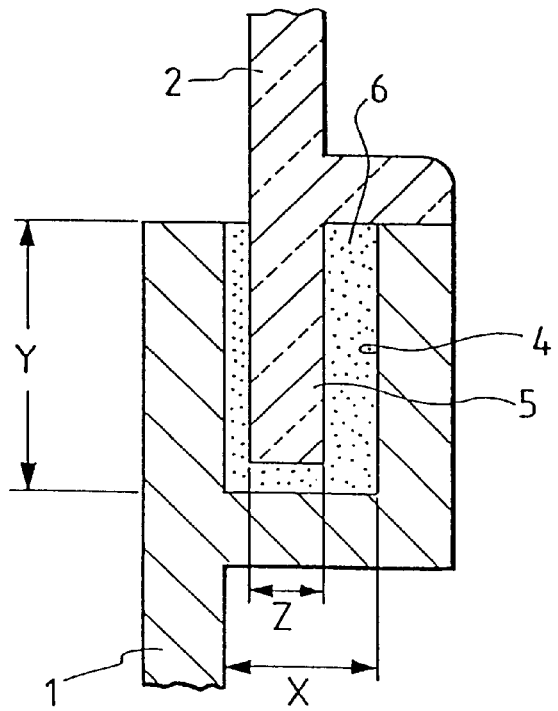
FIG. 2 is an enlarged sectional view showing essential parts of the lamp body and lens bonding structure shown in FIG. 1.

The vehicular lamp according to the embodiment, as shown in FIGS. 1 and 2, is provided with a lamp body 1, a lens 2 engaging with the front opening of the lamp body 1 in such a manner as to form a closed lamp chamber. The lamp body 1 is made of PP resin which is relatively low in material cost. As shown in FIG. 2, the lamp body 1 has a seal groove 4 along the front opening edge. The seal groove 4 is one joint part. On the other hand, the lens 2 is made of polycarbonate or polymethyl methacrylate, and it has a leg 5 along the periphery of the rear surface which is engaged with the seal groove 4 of the lamp body 1. That is, the leg 5 is the other joint part which is protruded backwardly. In the embodiment, in the seal groove 4, a dielectric bonding agent 6 is thermally hardened by high frequency dielectric heating (described later) for a short time, to obtain a great force of adhesion. Hence, in the embodiment, unlike the prior art, it is unnecessary to use a large quantity of adhesive agent. Accordingly, the groove width X and the groove depth Y of the seal groove 4 are smaller than those (the groove width x and the groove depth y) of the seal groove 54 of the conventional vehicular lamp (X<x, and Y<y). In addition, the groove with X of the seal groove 4 may be smaller than 2.5 times the wall thickness Z of the leg 5.

In FIG. 1, reference numeral 7 designates a light source held at the focal position F of a reflector 8 formed by the inner surface of the lamp body 1.

FIG. 3 is a comparison diagram showing the width H of the vehicular lamp (b) of the invention and the widths h and h' of the conventional vehicular lamp (a). In the vehicular lamp, unlike the conventional vehicular lamp, it is unnecessary to use the mechanical tightening means, namely, the plate spring 57. Furthermore, the width H of the vehicular lamp is smaller than the width h of the conventional vehicular lamp (H<h, h') in proportion to the reduction of the groove width X of the seal groove 4. Therefore, the width of the vehicular lamp is reduced without the change of the volume of the lamp chamber 3 nor the size of the reflector. This feature makes the external appearance of the vehicular lamp more attractive, and improves the effective utilization of the reflector 8 with respect to the width H of the vehicular lamp.

In the invention, the dielectric bonding agent 6 has a high coefficient of relative dielectric constant. That is, it is, for instance, 2 liquid urethane based adhesive agent whose dielectric loss coefficient is increased by mixing a suitable amount of filler, diluent or carbon high in specific dielectric capacity. The dielectric bonding agent 6 is thermally hardened instantaneously, in a matter of several tens of seconds, by high frequency dielectric heating treatment, to bond the leg 5 of the lens 2 to the seal groove 4 of the lamp body 1.

FIG. 4 shows other examples of the structures of the joint part of the lamp body and the joint part of the lens, which constitutes other embodiments of the invention. For simplification in description, the parts of those embodiments which are different from those of the above-described first embodiment will be described.

Figure 4A:
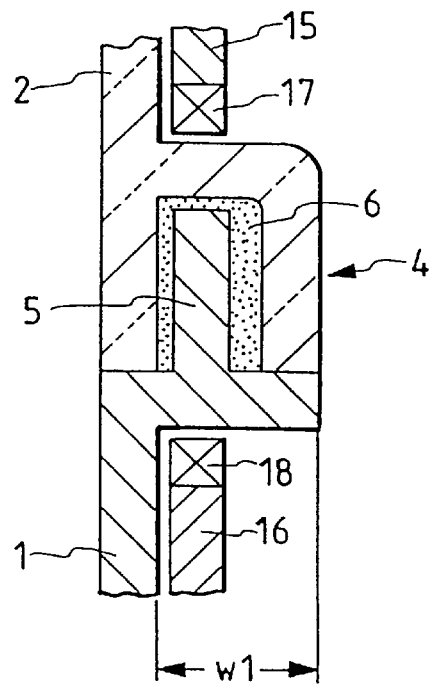
FIGS. 4A, 4B and 4C show other examples of the lamp body and lens body bonding structure, which constitute other embodiments. More specifically.

In the embodiment shown in FIG. 4A, the lamp body 1 has the leg 5, and the lens 2 has the seal groove 4. In the embodiment shown in FIG. 4B, the lamp body 1 has one joint part 9 which is substantially L-shaped, while the lens 2 has the other joint part 10 which is inverted-L-shaped in correspondence to the configuration of the one joint part 9. The other joint part 10 is slightly small in wall thickness when compared with the one joint part 9. And a dielectric bonding agent 6 is provided between those joint parts 9 and 10, and thermally hardened. In this case, the joint part width W2 of the joint parts 9 and 10 is smaller than the joint part with W1 in the bonding structure in which the seal groove 4 and the leg 5 are formed as shown in FIG. 4A. That is, the width of the vehicular lamp can be reduced more effectively. In the embodiment shown in FIG. 4C, the front opening edge of the lamp body 1, and the rear surface periphery of the lens 2 have flange-shaped joint parts 11 and 12, respectively, which are protruded circumferentially. The joint parts 11 and 12 have a pair of grooves 13 and 14, respectively. The dielectric bonding agent 6 is sealingly filled in the grooves 13 and 14, as shown in FIG. 4C. This structure reduces the quantity of dielectric bonding agent, and greatly decreases the total thickness S of the joint parts 11 and 12.

Figure 4B:
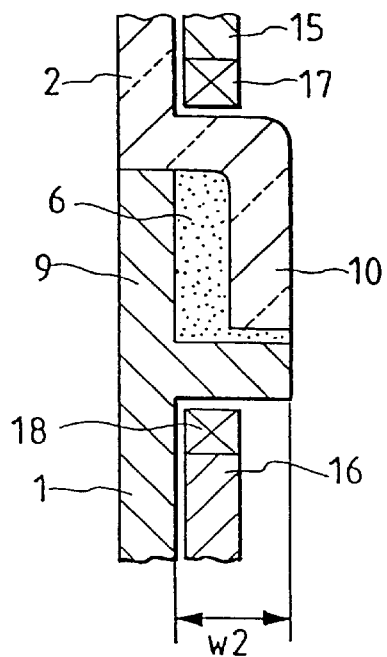
Figure 4C:
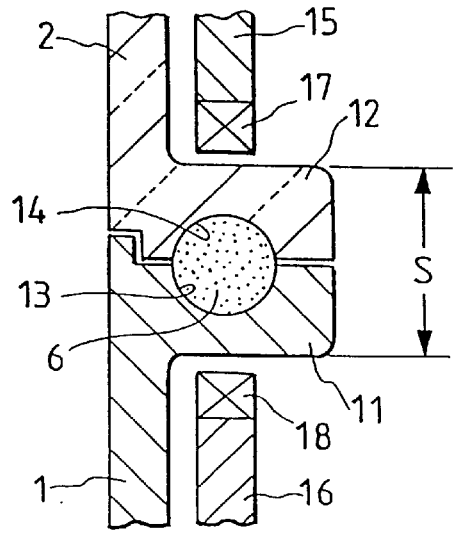
Figure 5A:
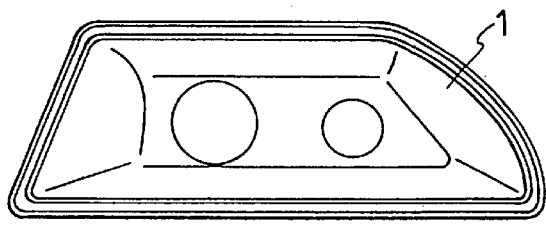
FIGS. 5A and 5B are diagrams for a description of a lamp body and lens bonding method according to the invention. More specifically.
Figure 5B:
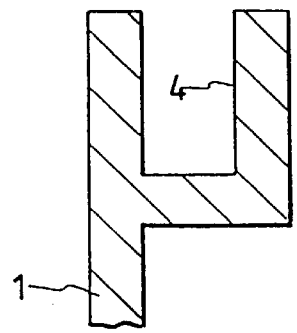
Figure 6A:
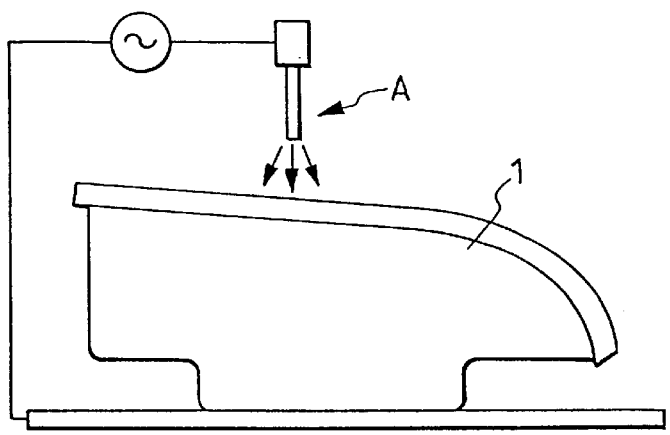
FIGS. 6A and 6B are diagrams for a description of an atmospheric plasma treatment of the lamp body and the lens. More specifically.
Figure 6B:
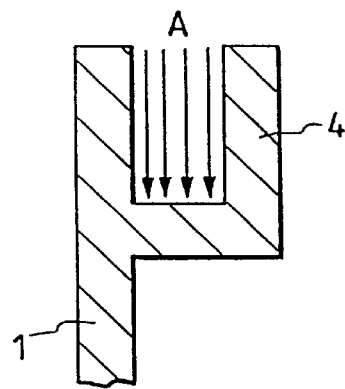
Figure 7A:
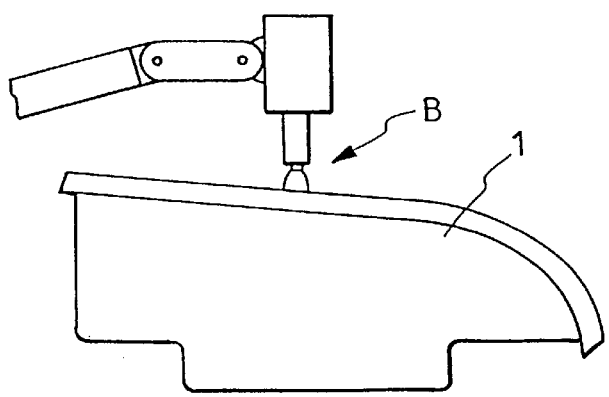
FIGS. 7A and 7B are diagrams for a description of an atmospheric plasma treatment. More specifically.
Figure 7B:
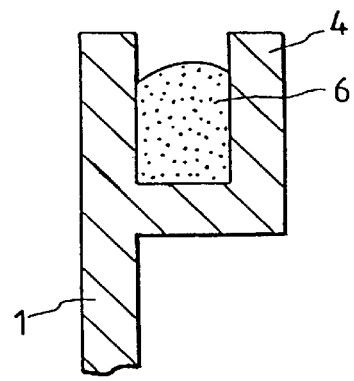
Figure 8A:
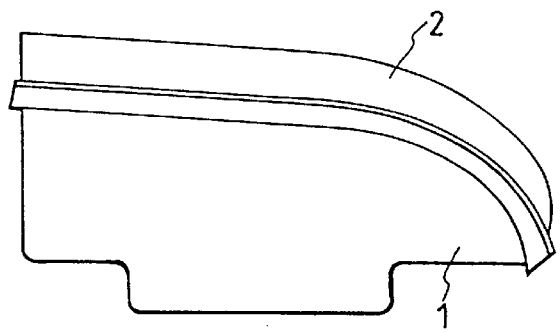
FIGS. 8A and 8B are diagrams showing the engagement of the leg of the lens with the seal groove of the lamp body. More specifically.
Figure 8B:
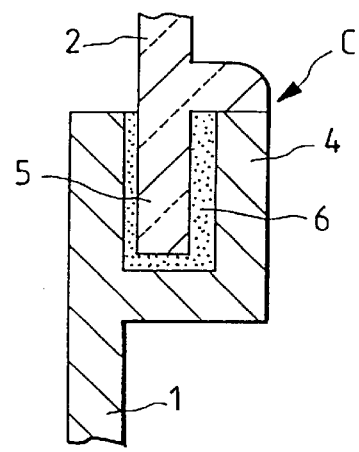
Figure 9A:
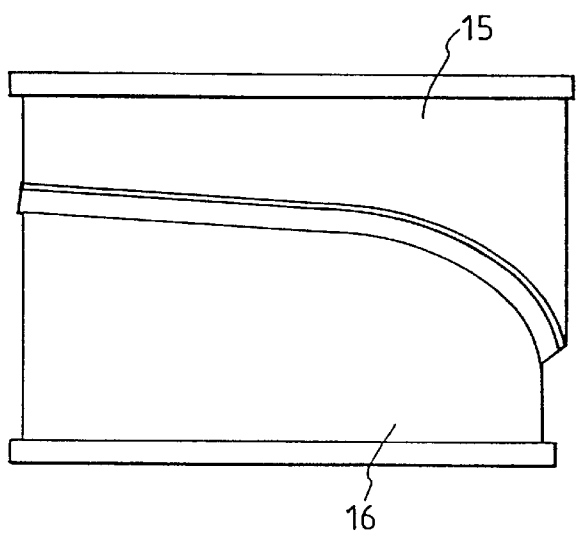
FIGS. 9A and 9B are diagrams for a description of a high frequency dielectric heating treatment. More specifically.
Figure 9B:
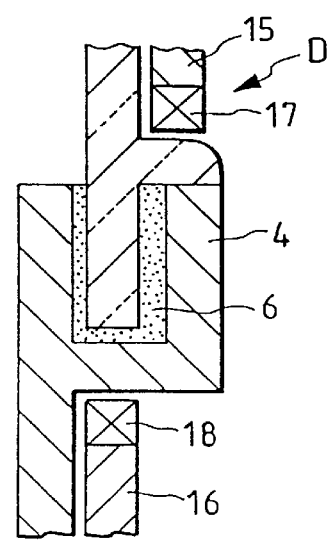
Figure 10:
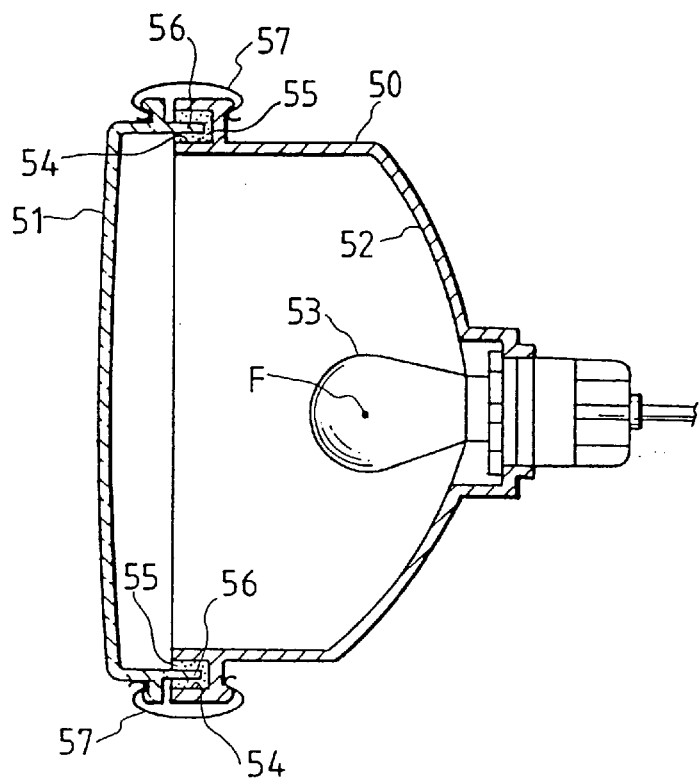
FIG. 10 is a longitudinal sectional view of a vehicular lamp having a conventional lamp body and lens bonding structure.
Figure 11:
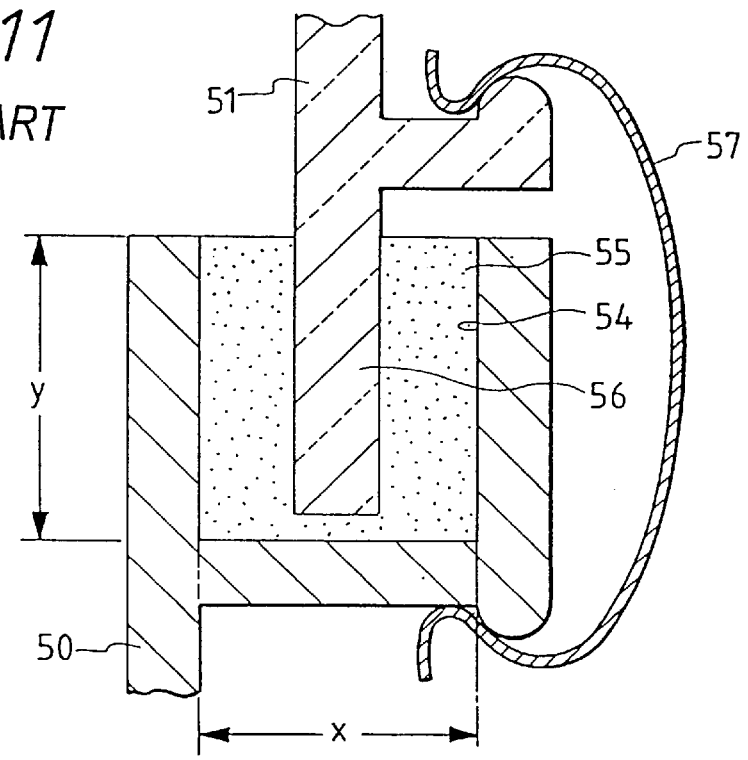
FIG. 11 is an enlarged sectional view showing essential parts of a conventional lamp body and lens bonding structure.

In FIGS. 4A, 4B and 4C, reference numeral 15 designates the upper jig used for high frequency dielectric heating treatment; 16, the lower jig; and 17 and 18, electrodes set on the jigs 15 and 16.

Now, a method of bonding a lamp body and a lens to each other according to the invention will be described.

FIGS. 5 through 9 shows bonding steps applied to the formation of the vehicular lamp, the first embodiment, of the invention.

First Step

An atmospheric plasma discharge treatment is applied to the inner surface of the seal groove of the lamp body 1 molded of PP resin (as indicated by the arrow A). As a result, ozone is formed. The strong oxidation reaction of the ozone cleans (removes dirt from) the surface of the PP resin, cuts the molecular chain to produce a polar group such as a carboxyl group and a ketone group, thereby to increase the strength of adhesion of the dielectric bonding agent 6 to the PP resin (cf. FIG. 6). The time required for the aforementioned atmospheric plasma discharge treatment is preferably about sixty to ninety seconds.

Second Step

After the atmospheric plasma discharge treatment, the dielectric bonding agent 6 is applied to the seal groove 4 (the arrow B), and the leg 5 of the lens 2 is fitted in the seal groove 4. Under this condition, the upper jig 15 is set on the opening of the seal groove 4 (the arrow C), while the lower jig 16 is laid over the outer surface of the bottom of the seal groove 4. Thereafter, a high frequency voltage is applied across the electrodes 17 and 18 mounted on the jigs 15 and 16, to thermally solidify the dielectric bonding agent 6 instantaneously, in a matter of seconds (cf. FIG. 9). The time required for this high frequency dielectric heating treatment (the arrow D) is preferably around twenty seconds.

That is, when, with the dielectric bonding agent 6 filled in between the electrodes 17 and 18, a positive (+) voltage is applied to one electrode 17 while a negative (−) voltage is applied to the other electrode 18, then the molecules of the adhesive agent 6 are regularly arranged. When, thereafter, the voltage applied across the electrodes 17 and 18 is changed to AC voltage, then the molecular rotation occurs to generate high frictional heat between molecules, so that the temperature of the dielectric bonding agent 6 is quickly increased, thus being thermally solidified.

The lamp body 1 and the lens subjected to high frequency dielectric heating treatment in the above-described manner are completely bonded to each other in about sixty seconds after the heating treatment, that is, they are completely water-proof.

As was described above, in the lamp body and lens bonding structure of the invention, the width and depth of the seal groove of the lamp body are smaller, which makes the external appearance of the vehicle attractive, and the great force of adhesion between the lamp body and the lens makes it unnecessary to use the reinforcing member such as the plate spring (which is essential with the conventional vehicular lamp). Those features make it possible to manufacture the vehicular lamp which is light in weight and simple in structure, which contributes to a reduction in fuel consumption. Furthermore, the manufacturing cost of the vehicular lamp is decreased, and the space in the engine room is relatively increased.

The high frequency dielectric heating treatment makes it possible to positively bond the lens to the lamp body of PP resin which is not expensive, and to greatly shorten the time required for the bonding treatment. This feature improves the productivity of the vehicular lamp, and decreases the space occupied by the vehicular lamp manufacturing equipment. Further-more, the vehicular lamp is lower in manufacturing cost than the conventional one. Those effects or merits of the invention should be highly appreciated in practical use.

What is claimed is:

1. A vehicular lamp comprising:

a lamp body having a front opening;

a front lens coupled to said front opening of said lamp body;

a reflector formed on an inner surface of said lamp body;

a lamp bulb coupled to said lamp body and disposed between said front lens and said reflector; and a dielectric bonding agent applied between a joint of said lamp body and a joint of said front lens; and wherein said joint of said lamp body comprises a seal groove and said joint of said front lens comprises a leg fitted in said seal groove of said lamp body; and wherein an inner surface of the seal groove of the lamp body has undergone an atmospheric plasma discharge treatment.

2. The vehicular lamp of claim 1, wherein said joint of said lamp body is substantially L-shaped and said joint of said front lens is inverted-L-shaped in correspondence to said L-shaped joint of said lamp body.

3. The vehicular lamp of claim 1, wherein said joint of said lamp body and said joint of said front lens are flange-shaped, and said dielectric bonding agent is applied to a groove defined by said flange-shaped joints of said lamp body and said front lens.

4. The vehicular lamp of claim 1, wherein a groove width of said seal groove is smaller than 2.5 times a wall thickness of said leg.

5. The vehicular lamp of claim 1, wherein said lamp body is formed from polypropylene resin.

6. The vehicular lamp of claim 1, wherein said dielectric bonding agent is formed of a material having high dielectric loss coefficient.

7. The vehicular lamp of claim 6, wherein said material of said dielectric bonding agent comprises at least one of filler, diluent and carbon.

8. The vehicular lamp of claim 6, wherein said material of said dielectric bonding agent is a 2 liquid urethane-based adhesive agent.

9. A vehicular lamp comprising:

a lamp body having a front opening;

a front lens coupled to said front opening of said lamp body;

a reflector formed on an inner surface of said lamp body;

a lamp bulb coupled to said lamp body and disposed between said front lens and said reflector; and a dielectric bonding agent applied between a joint of said lamp body and a joint of said front lens; and wherein said front lens is bonded to said lamp body by applying a high frequency voltage to said dielectric bonding agent.

* * * * *